(12) United States Patent
Hayes et al.

(10) Patent No.: US 10,539,347 B2
(45) Date of Patent: Jan. 21, 2020

(54) CONTROL SYSTEM

(71) Applicants: Matthew James Hayes, Cambridge (GB); Catherine Rose Fitzpatrick, Cambridge (GB)

(72) Inventors: Matthew James Hayes, Cambridge (GB); Catherine Rose Fitzpatrick, Cambridge (GB)

(73) Assignee: Evonetix Limited, Cambridge, Cambridgeshire (GB)

( * ) Notice: Subject to any disclaimer, the term of this patent is extended or adjusted under 35 U.S.C. 154(b) by 109 days.

(21) Appl. No.: 15/737,464

(22) PCT Filed: Jul. 6, 2016

(86) PCT No.: PCT/GB2016/052039
§ 371 (c)(1),
(2) Date: Dec. 18, 2017

(87) PCT Pub. No.: WO2017/006119
PCT Pub. Date: Jan. 12, 2017

(65) Prior Publication Data
US 2018/0195776 A1    Jul. 12, 2018

(30) Foreign Application Priority Data
Jul. 6, 2015 (GB) .................................. 1511802.9

(51) Int. Cl.
F25B 21/02    (2006.01)
G05D 23/19    (2006.01)

(52) U.S. Cl.
CPC ......... *F25B 21/02* (2013.01); *G05D 23/1919* (2013.01); *G05D 23/1934* (2013.01);
(Continued)

(58) Field of Classification Search
CPC .............. F25B 21/02; F25B 2321/0212; F25B 2321/025; F25B 2700/2107; G05D 23/1919; G05D 23/1934
See application file for complete search history.

(56) References Cited

U.S. PATENT DOCUMENTS 3,091,939 A    6/1963    Baude
6,401,462 B1   6/2002    Bielinski
(Continued)

FOREIGN PATENT DOCUMENTS

DE    10 2006 023451    11/2007
EP    0 478 204    4/1992
(Continued)

OTHER PUBLICATIONS

International Search Report and Written Opinion of the ISA for PCT/GB2016/052039, dated Mar. 8, 2017, 15 pages.
(Continued)

*Primary Examiner* — Marc E Norman
(74) *Attorney, Agent, or Firm* — Nixon & Vanderhye P.C.

(57) ABSTRACT

A controller for a thermo-electric cooler is disclosed. The controller comprises a current source for providing current for driving the thermo-electric cooler and a plurality of voltage supply connections for providing a plurality of different voltages for driving current controlled by the current source through the thermo-electric cooler. Voltage selection circuitry is provided for selecting a voltage from the plurality of different voltages, when connected, and for applying the voltage selected to the thermo-electric cooler. When selecting the voltage from the plurality of different voltages, the voltage selection circuitry is configured to select the voltage that, when compared to the other voltages of the plurality of voltages, minimises a potential difference across the current source.

10 Claims, 13 Drawing Sheets

(52) U.S. Cl.
CPC . *F25B 2321/025* (2013.01); *F25B 2321/0212* (2013.01); *F25B 2700/2107* (2013.01)

(56) References Cited

U.S. PATENT DOCUMENTS

| | | | |
|---|---|---|---|
| 2002/0139123 A1* | 10/2002 | Bell | F02G 1/043 62/3.7 |
| 2005/0039465 A1 | 2/2005 | Welch | |
| 2007/0079616 A1 | 4/2007 | Deal | |
| 2008/0238964 A1 | 10/2008 | Umeda | |
| 2009/0195980 A1* | 8/2009 | Shih | F25B 21/02 361/688 |

FOREIGN PATENT DOCUMENTS

| | | |
|---|---|---|
| EP | 2 336 679 | 6/2011 |
| EP | 2 352 645 | 8/2011 |
| JP | 2008-238642 | 10/2008 |
| WO | WO 1999/036960 | 7/1999 |
| WO | WO 2007/001291 | 1/2007 |
| WO | WO 2010/052132 | 5/2010 |
| WO | WO 2010/088433 | 8/2010 |
| WO | WO 2015/039022 | 3/2015 |

OTHER PUBLICATIONS

Search Report for GB 1511802.9, dated Jan. 18, 2016, 5 pages.
Lineykin et al. "PSPICE—Compatible Equivalent Circuit of Thermoelectric Coolers", Proc 36th IEEE PESC, p. 608-612, Jun. 16, 2005.

\* cited by examiner

CONTROL SYSTEM

This application is the U.S. national phase of International Application No. PCT/GB2016/052039 filed Jul. 6, 2016, which designated the U.S. and claims priority to GB Patent Application No. 1511802.9 filed Jul. 6, 2015, the entire contents of each of which are hereby incorporated by reference.

The present invention relates to a control system and to associated apparatus and methods. The invention has particular although not exclusive relevance to a control system for a thermo-electric cooler (TEC) cell.

Thermo-electric cooling makes use of the Peltier effect in which electric current passing across the junction of two dissimilar conductors causes, depending on the direction of current flow, a heating effect or a cooling effect. A thermo-electric cooler (TEC) is, in effect, a heat pump that transfers heat from one side of the device (a thermal load) to the other (a heat sink or heat store). Whilst the term TEC is used throughout this document TECs (and similar devices) are known by a variety of names including: thermo-electric heat pump; Peltier cooler; peltier heater; Peltier device; Peltier heat pump; solid state refrigerator; etc.

By way of background, FIG. 1 illustrates the basic elements of a control circuit 100 for a typical TEC cell 102. The TEC cell 102 itself can pump heat in either direction between a thermal load 104, whose temperature is to be controlled, and a heat sink 106 (or heat store). A current driver 108 supplies electrical current to the TEC 102, commonly with a pulse-width-modulated (PWM) voltage source or a continuous (linear) current source.

However, whilst switching techniques for PWM schemes can be implemented on silicon, they require large external inductors to smooth the current. Moreover, the thin-film TECs that would typically be used for small scale applications require continuous current control because they are easily damaged by PWM transients due to their low thermal mass.

In order to provide appropriate current control, the control circuit includes a temperature sensor 110 to measure the temperature of the thermal load 104, which is then compared to the desired set-point $r_s$ (referred to as the temperature demand) within a controller 112. The purpose of the controller 112 is to control the current delivered to the TEC to ensure the stability and specified dynamics of the resulting closed-loop system.

There are many well-known controller design strategies, ranging from simple linear approaches such as a Proportional/Integral/Derivative (PID) controller to complex, adaptive, digital schemes. The control problem is complicated by the fact that the heat pumped by the TEC is a non-linear function of both the electrical current (which is set by the controller) and the temperature of both sides of the TEC. This means that the small-signal gain around the feedback loop depends upon the TEC temperatures and the large-signal current flowing through it.

While linear controllers work well as regulators, where near-constant conditions result in stable gains, they struggle to control the dynamic transition between temperatures or to operate across a wide temperature range.

More complex digital controllers may be used in an attempt to circumvent these problems using a range of techniques from lookup tables for PID coefficients at different set-points to full model-predictive or adaptive control schemes. Such controllers are, however, relatively complex requiring analogue to digital converters (ADCs), digital to analogue converters (DACs), clocks, processors and the like. This complexity also limits the extent to which TEC cells controlled by such circuitry can be miniaturised.

Moreover, existing approaches to linear current source design are not compatible with miniaturisation because the use of linear current sources result in power dissipation that is too high to be dissipated by miniaturised transistors.

Further, the voltage required to drive a particular current through a TEC depends on the temperature difference across it, requiring significant compliance in any current source that further exacerbates power dissipation issues.

The present invention seeks to provide a controller, and in particular but not limited to a controller for a thermo-electric cooler, and associated apparatus and methods for meeting or at least partially contributing to addressing the above issues.

In one aspect of the invention there is provided a controller, the controller comprising: a current source for providing current for driving a thermo-electric device; a plurality of voltage supply connections for providing a plurality of different voltages for driving current controlled by the current source through the thermo-electric device; and voltage selection circuitry for selecting a voltage from the plurality of different voltages, when connected, and for applying the voltage selected to the thermo-electric device; wherein, when selecting the voltage from the plurality of different voltages, the voltage selection circuitry is configured to select the voltage that, when compared to the other voltages of the plurality of voltages, minimises a potential difference across the current source.

The voltage selection circuitry may be operable to minimise a potential difference across the current source by providing a potential difference across the current source that is closest to a predetermined reference voltage. The voltage selection circuitry may be configured to select the voltage that, when compared to the other voltages of the plurality of voltages, provides a potential difference across the current source that is less than 2V, preferably less than 1V (for example, approximately equal to (within 10% of) 0.5V). The predetermined voltage may be approximately equal to (within 10% of) the potential difference between a pair of the plurality of different voltages that are adjacent one another in voltage when the voltages are ordered by increasing voltage. The voltage selection circuitry may comprise a mixed signal servo loop.

The controller may comprise control circuitry for controlling the current source, in dependence on changes in the temperature of a thermal load, in order to maintain the temperature of the thermal load. The control circuitry may comprise a non-linear control function for providing a non-linear response, to changes in the temperature, for controlling the current source whereby to maintain the temperature of the thermal load. The non-linear control function may be implemented using analogue circuitry.

The source may be a local current source and may further comprise at least one current boost connection for connecting to a current boost source for providing additional current for driving the thermo-electric cooler. Current boost circuitry may be provided for requesting current supply from the current boost source for driving the thermo-electric cooler. The current boost circuitry may be configured to request the current supply from the current boost source when current from the local current source will be insufficient to drive the thermo-electric device, to receive an indication that a current boost source is available responsive to the request, and to connect to the available current boost source responsive to the indication.

In one aspect of the invention there is provided a controller for a thermo-electric device, the controller comprising: a current source for providing current for driving the thermo-electric device for changing a temperature of a thermal load; and control circuitry for controlling the current source, in dependence on changes in the temperature of the thermal load, in order to maintain the temperature of the thermal load; wherein the control circuitry comprises a non-linear control function for providing a non-linear response, to changes in the temperature, for controlling the current source whereby to maintain the temperature of the thermal load; and wherein the non-linear control function is implemented using analogue circuitry.

The non-linear control function may be a function representing an analytic inversion of a thermal model.

The thermal model may be a model in which thermal properties of heat flow, thermal resistance and/or thermal mass are respectively represented by electrical current, electrical resistance and/or electrical capacitance respectively. The non-linear function may be implemented using current mode circuitry. 12. The non-linear function may be implemented using voltage mode circuitry.

In one aspect of the invention there is provided a controller for a thermo-electric device, the controller comprising: a local current source for providing current for driving the thermo-electric device; at least one current boost connection for connecting to a current boost source for providing additional current for driving the thermo-electric device; and current boost circuitry for requesting current supply from the current boost source for driving the thermo-electric device; wherein, the current boost circuitry is configured to request the current supply from the current boost source when current from the local current source will be insufficient to drive the thermo-electric device, to receive an indication that a current boost source is available responsive to the request, and to connect to the available current boost source responsive to the indication.

In one aspect of the invention there is provided a thermo-electric cell comprising a thermo-electric device and a controller according to any preceding aspect.

In one aspect of the invention there is provided thermo-electric apparatus for providing independent and localised thermo-electric cooling or heating at a plurality of different locations, the thermo-electric apparatus comprising an array of thermo-electric cells referred to previously.

In one aspect of the invention there is provided thermo-electric apparatus for providing independent thermo-electric cooling or heating at a plurality of different locations, the thermo-electric apparatus comprising: an array of thermo-electric cells, wherein each thermo-electric cell is operable to provide respective thermo-electric cooling or heating at a corresponding location, and wherein each thermo-electric cell comprises a respective local controller, each local controller being a controller as described above; and a master controller operable to receive requests from the local controllers of the thermo-electric cells for current supply from a current boost source, for allocating a respective current boost source to each thermo-electric cell having a local controller from which a request has been received, depending on availability, and for providing a corresponding indication, that the allocated current boost source is available, to the local controller of the thermo-electric cell to which that current boost source has been allocated.

The master controller may be operable to manage the timing at which temperature transitions are applied by the thermo-electric cells such that a temperature transition applied by at least one of the thermo-electric cells is staggered in time with respect to a temperature transition applied by at least one other of the thermo-electric cells.

In one aspect of the invention there is provided a method performed by a controller for a thermo-electric device, the method comprising: providing, from a current source, current for driving the thermo-electric device; providing a plurality of different voltages, at a plurality of voltage supply connections, for driving current controlled by the current source through the thermo-electric device; and selecting, using voltage selection circuitry, a voltage from the plurality of different voltages, and applying the voltage selected to the thermo-electric device; wherein, when selecting the voltage from the plurality of different voltages, the voltage selection circuitry is configured to automatically select the voltage that, when compared to the other voltages of the plurality of voltages, minimises a potential difference across the current source.

In one aspect of the invention there is provided a method performed by a controller for a thermo-electric device, the method comprising: providing, from a current source, current for driving the thermo-electric device for changing a temperature of a thermal load; and controlling, using control circuitry, the current source, in dependence on changes in the temperature of the thermal load, to maintain the temperature of the thermal load; providing, using a non-linear control function implemented using analogue circuitry, a non-linear response to changes in the temperature, for controlling the current source, whereby to maintain the temperature of the thermal load.

In one aspect of the invention there is provided a method performed by a controller for a thermo-electric device, the method comprising: providing, from a local current source, current for driving the thermo-electric device; providing at least one current boost connection for connecting to a current boost source for providing additional current for driving the thermo-electric device; requesting, using current boost circuitry, current supply from the current boost source for driving the thermo-electric device when current from the local current source will be insufficient to drive the thermo-electric device; receiving an indication that a current boost source is available responsive to the request; and connecting to the available current boost source via a corresponding current boost connection responsive to the indication.

In one aspect of the invention there is provided a method, performed by thermo-electric apparatus, of providing independent thermo-electric cooling or heating at a plurality of different locations, the method comprising: providing, via each thermo-electric cell of an array of thermo-electric cells, respective thermo-electric cooling or heating at a corresponding location, wherein each thermo-electric cell comprises a respective local controller, each local controller being a controller as described above; receiving, via a master controller, requests from the local controllers of the thermo-electric cells for current supply from a current boost source; allocating, via the master controller, a respective current boost source to each thermo-electric cell having a local controller from which a request has been received, depending on availability; and for providing, via a master controller, a corresponding indication, that the allocated current boost source is available, to the local controller of the thermo-electric cell to which that current boost source has been allocated.

The master controller may manage the timing at which temperature transitions are applied by the thermo-electric cells such that a temperature transition applied by at least one of the thermo-electric cells is staggered in time with respect to a temperature transition applied by at least one other of the thermo-electric cells.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described by way of example only with reference to the attached figures in which:

FIG. 1 schematically illustrates a conventional control system for a thermo-electric cooler;

FIG. 2 schematically illustrates an example of an improved control system for a thermo-electric cooler (TEC);

Figure 5:
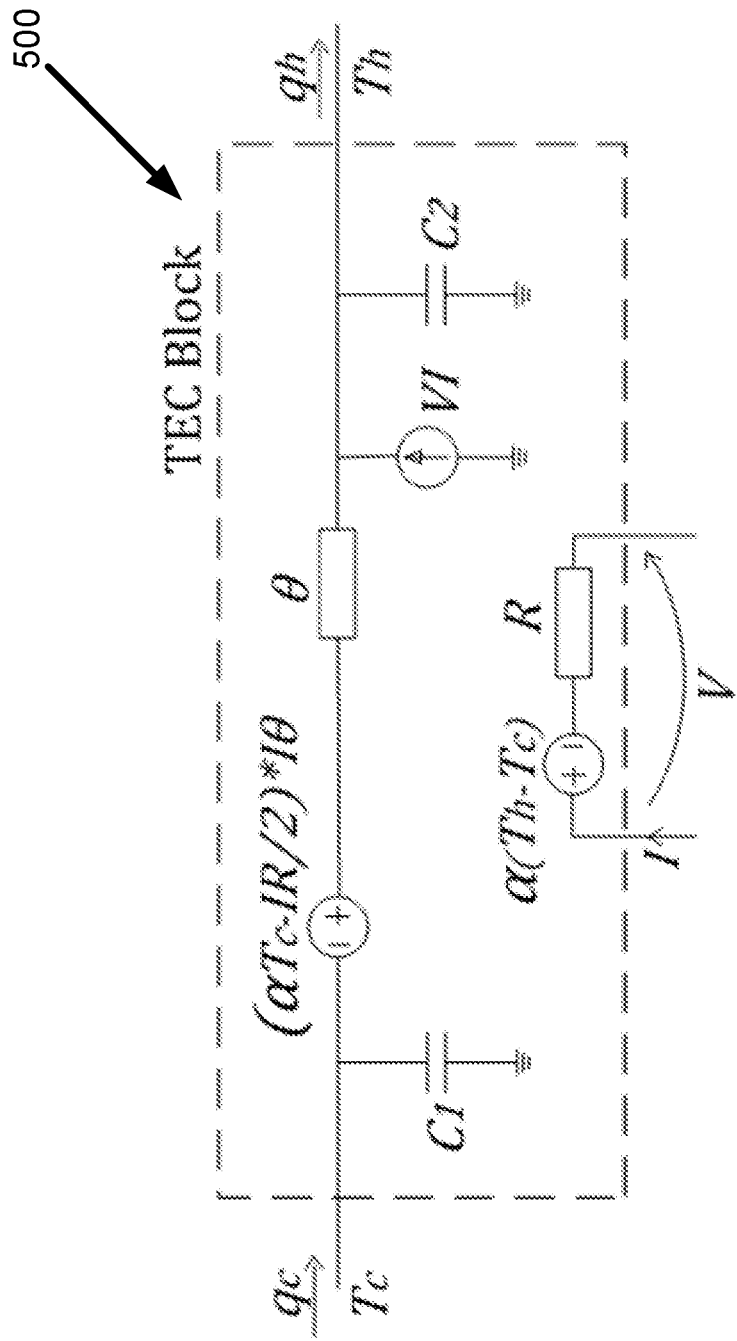
Figure 6:
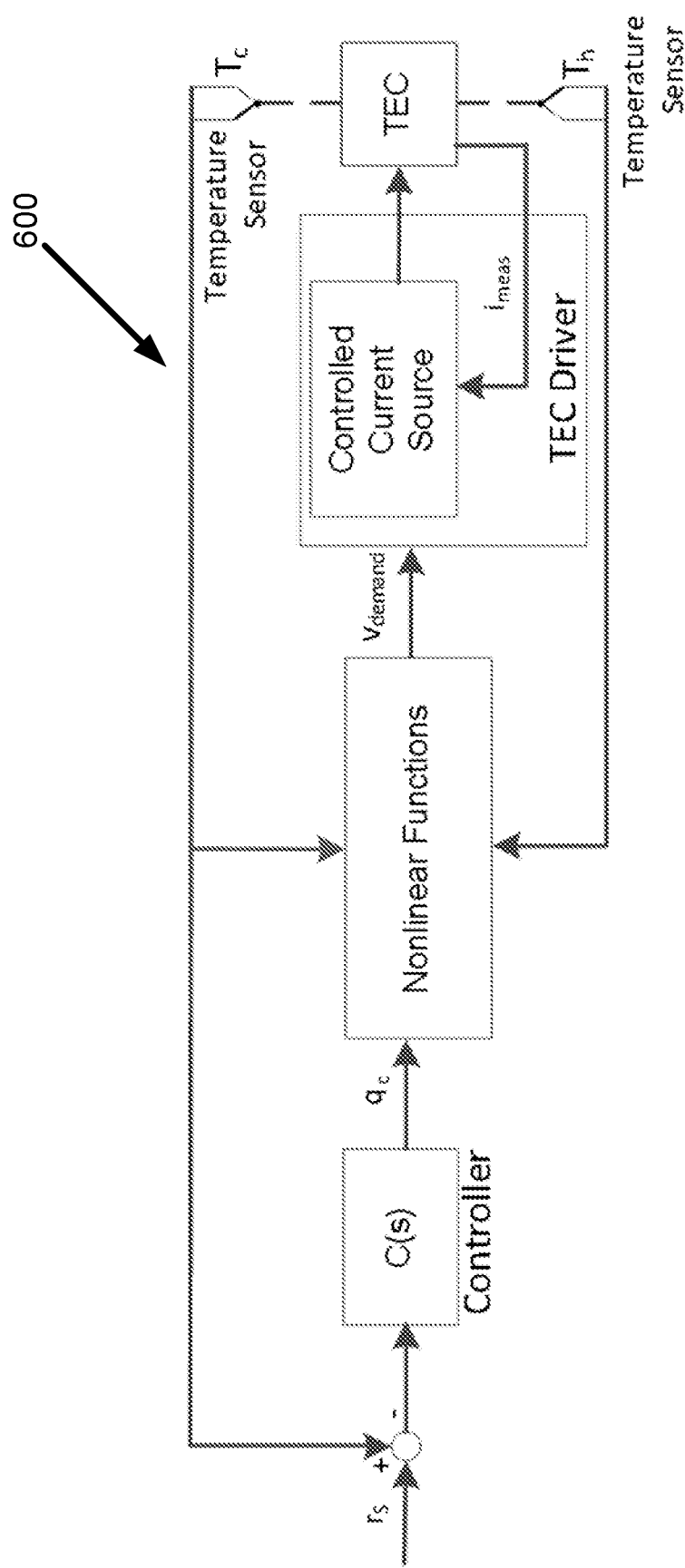
Figure 7:
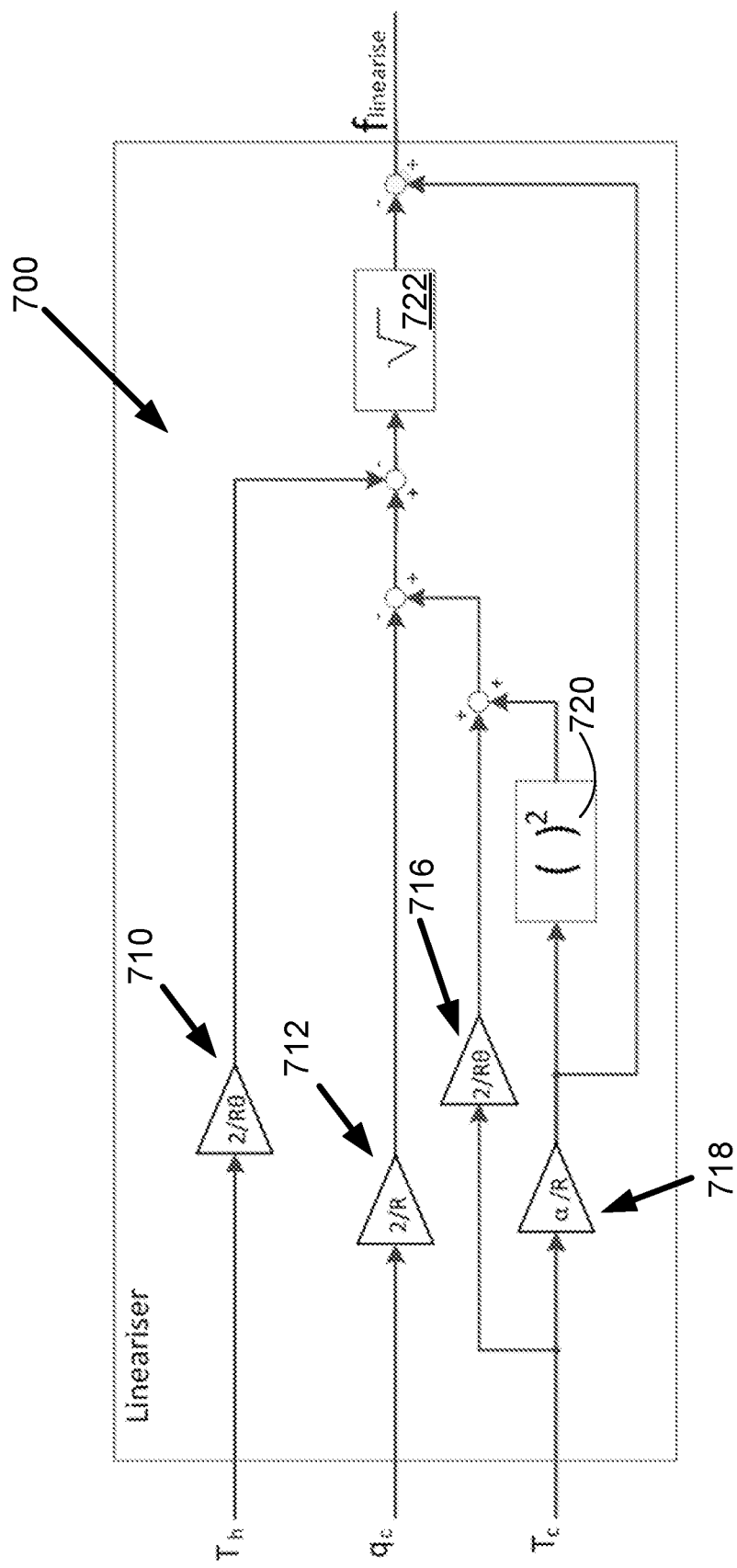
Figure 8:
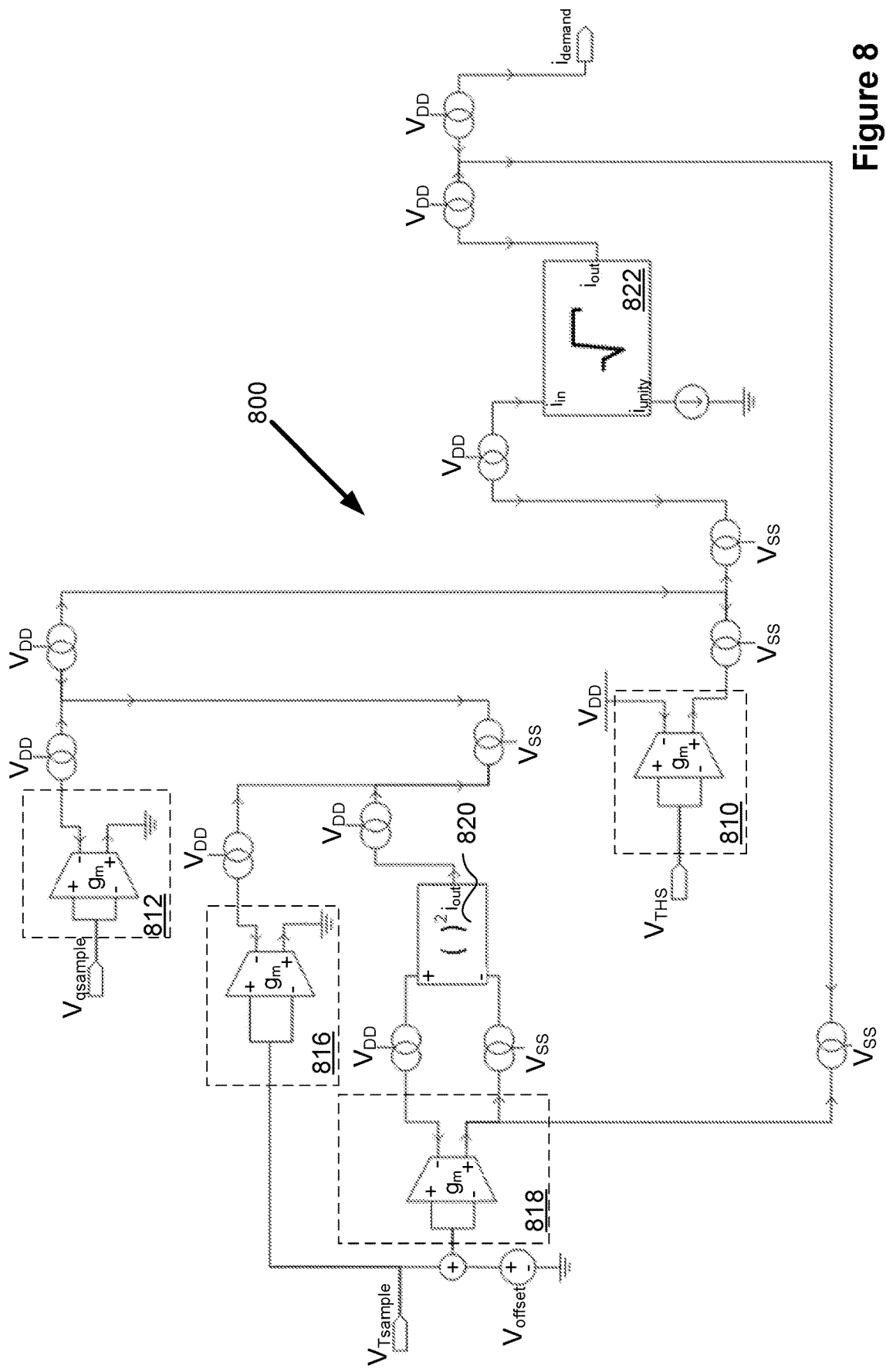
Figure 9:
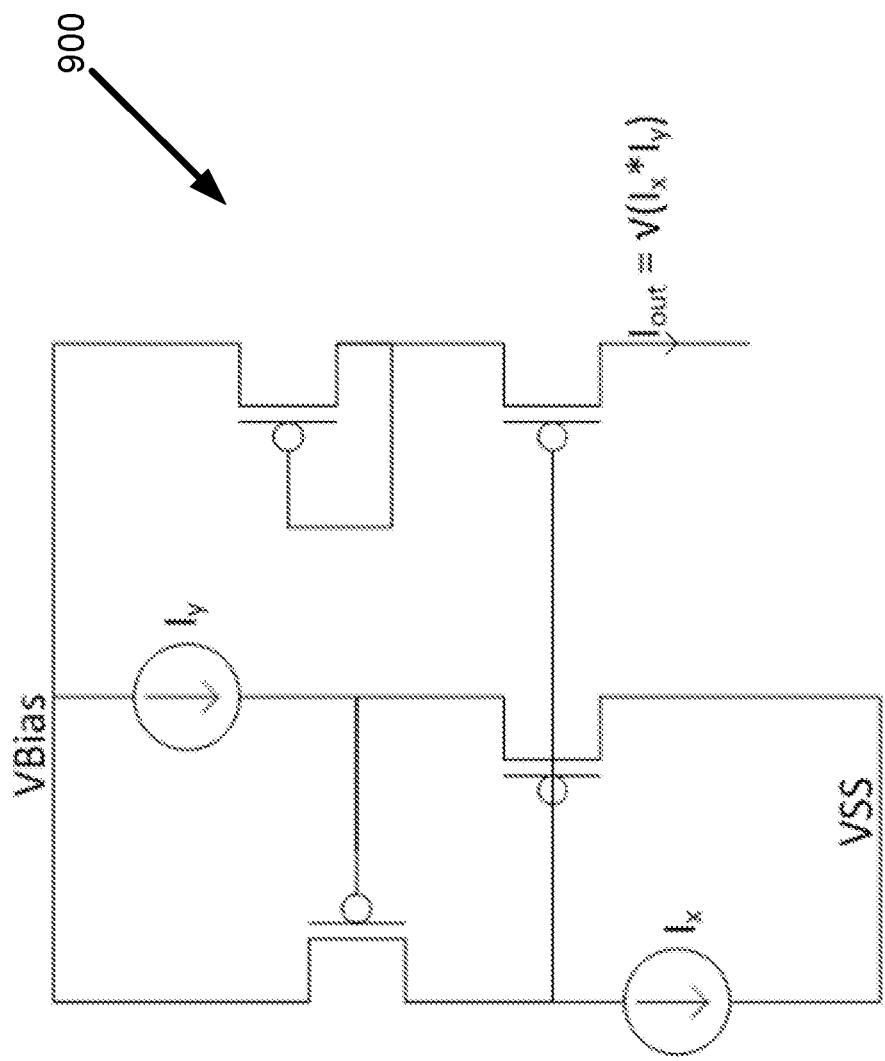
Figure 10:
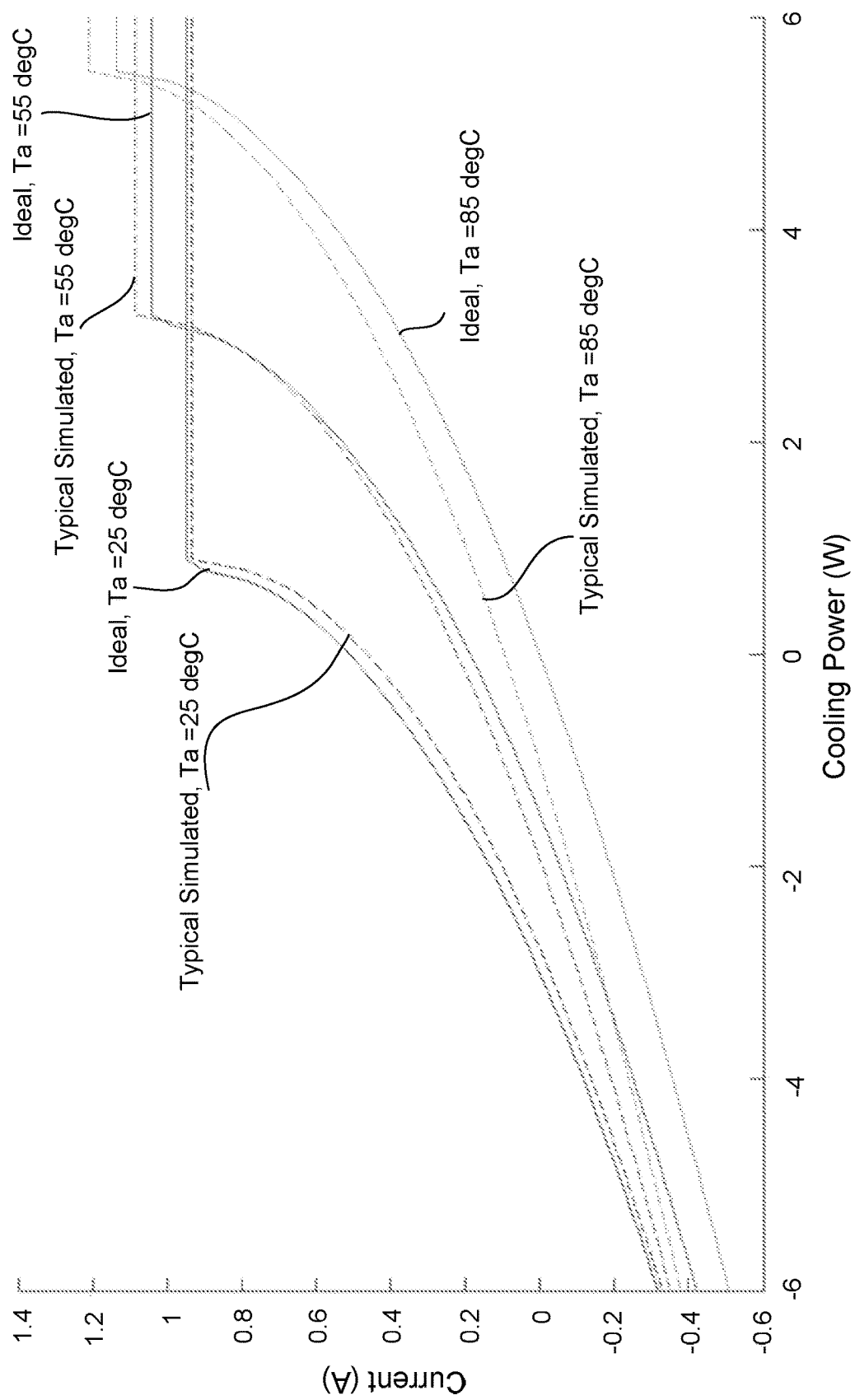
Figure 11:
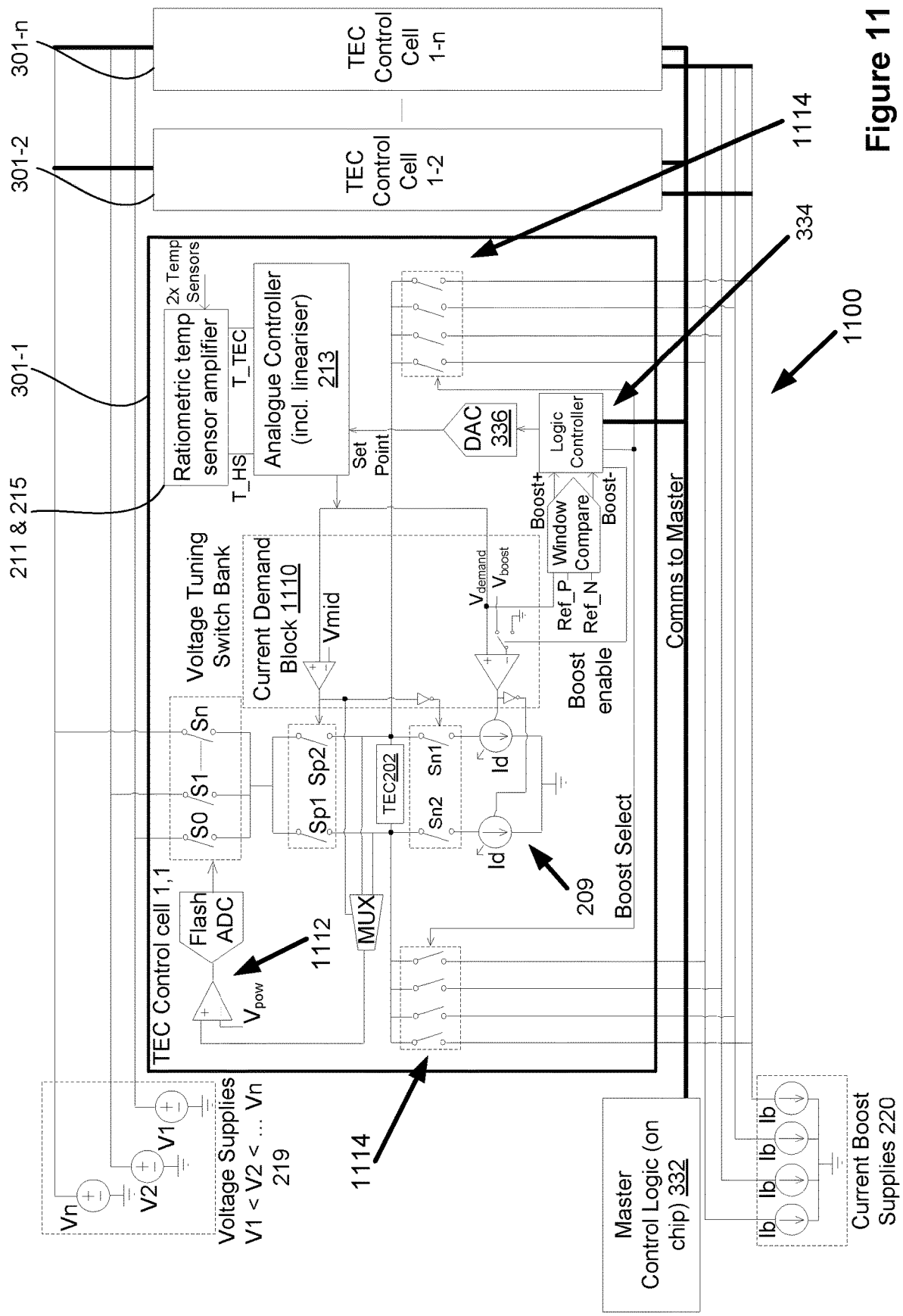
Figure 12:
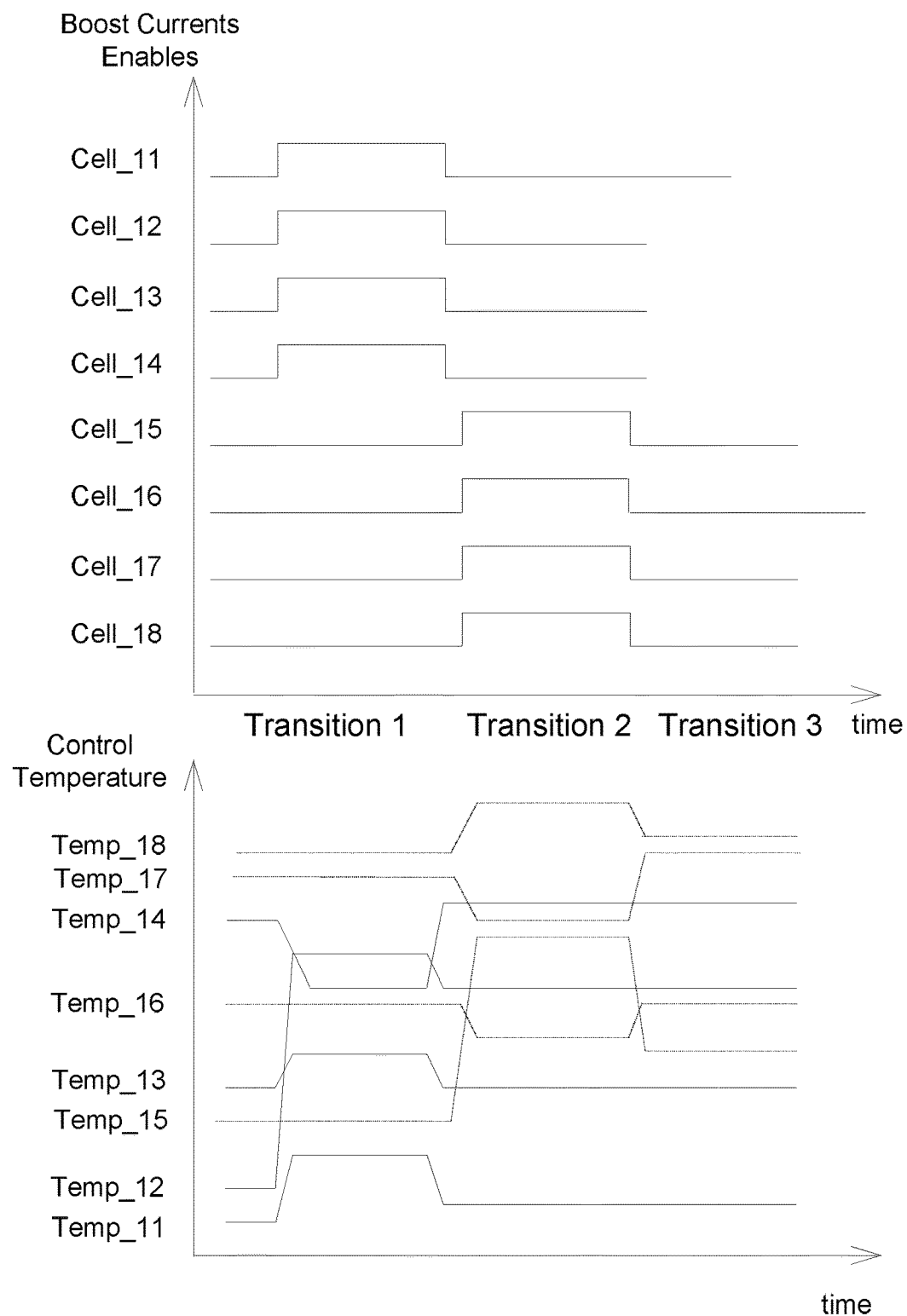
Figure 13:
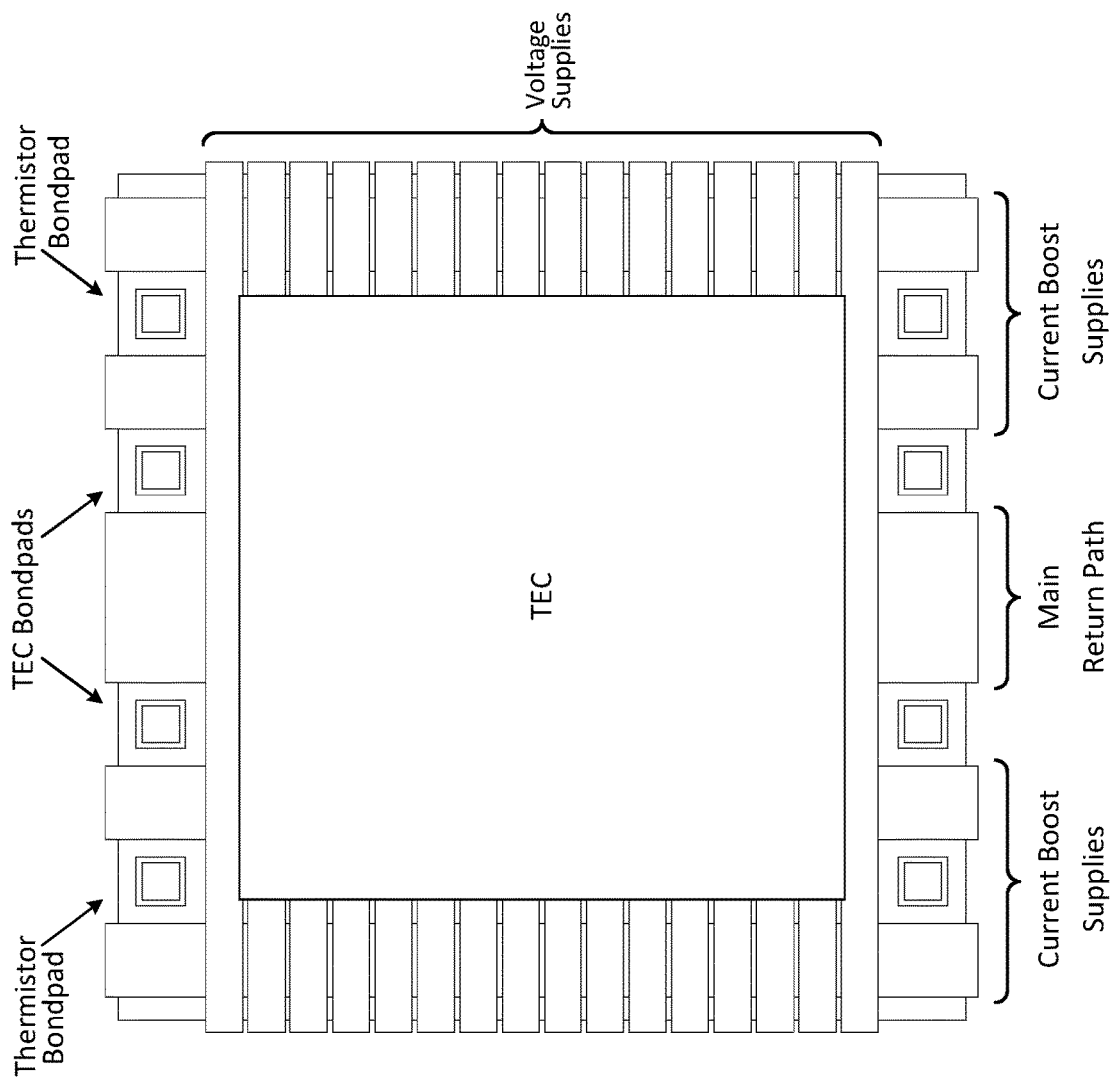

FIG. 5 schematically illustrates an electrical model of TEC;

FIG. 6 schematically illustrates a control system architecture;

FIG. 7 is a simplified schematic of a lineariser in which the lineariser functionality is decomposed into operator elements;

FIG. 8 schematically illustrates an example of a current-mode embodiment of the lineariser design; and FIG. 9 schematically illustrates an example of a trans-linear square root circuit;

FIG. 10 is a graph illustrating a comparison of a derived lineariser function with a simulation of a trans-linear analogue implementation of that lineariser function;

FIG. 11 schematically illustrates an example of a TEC array control system;

FIG. 12 is a timing diagram illustrating staggered temperature transitions for a plurality of TEC control cells; and FIG. 13 is a simplified physical layout of an exemplary TEC control cell.

OVERVIEW

An exemplary control system will now be described, by way of example only, with reference to FIG. 2 which schematically illustrates an example of a control cell for a thermo-electric cooler (TEC) generally at 200. It will be appreciated that whilst, for simplicity, only a single TEC control cell 200 is shown, the control system is designed for providing TEC control in an application in which many such TEC control cells are integrated, in close proximity to one another, on a single semiconductor chip.

Figure 1:
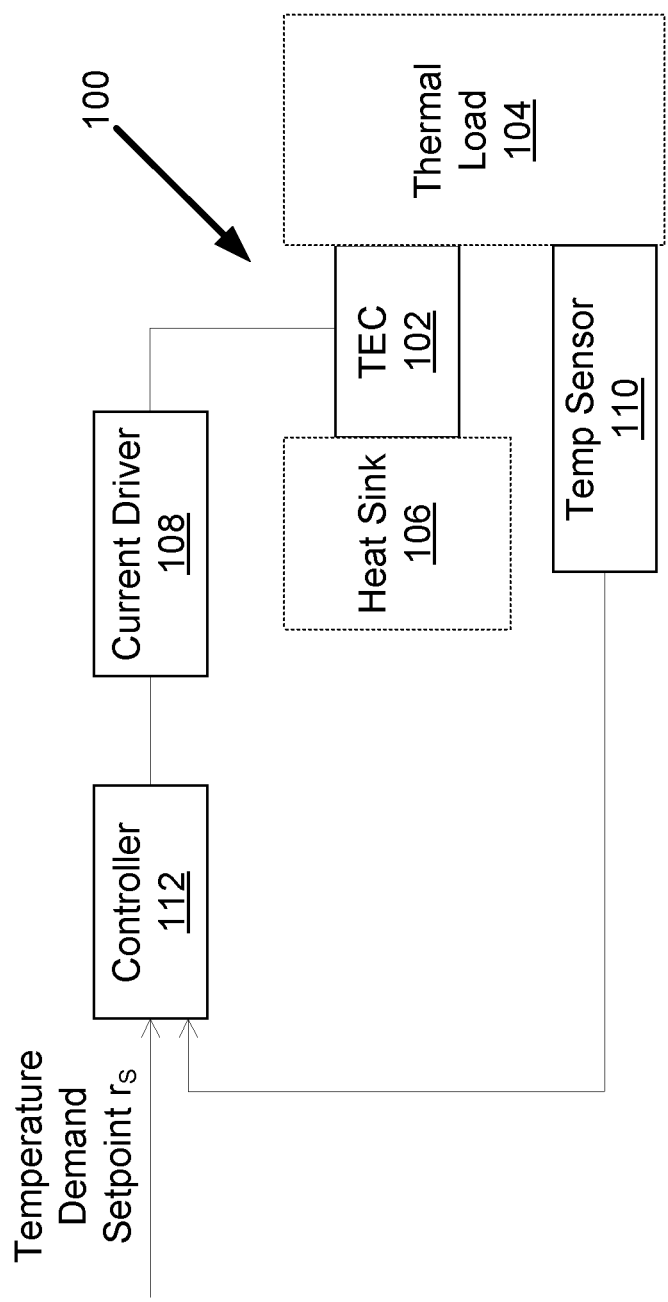
Figure 2:
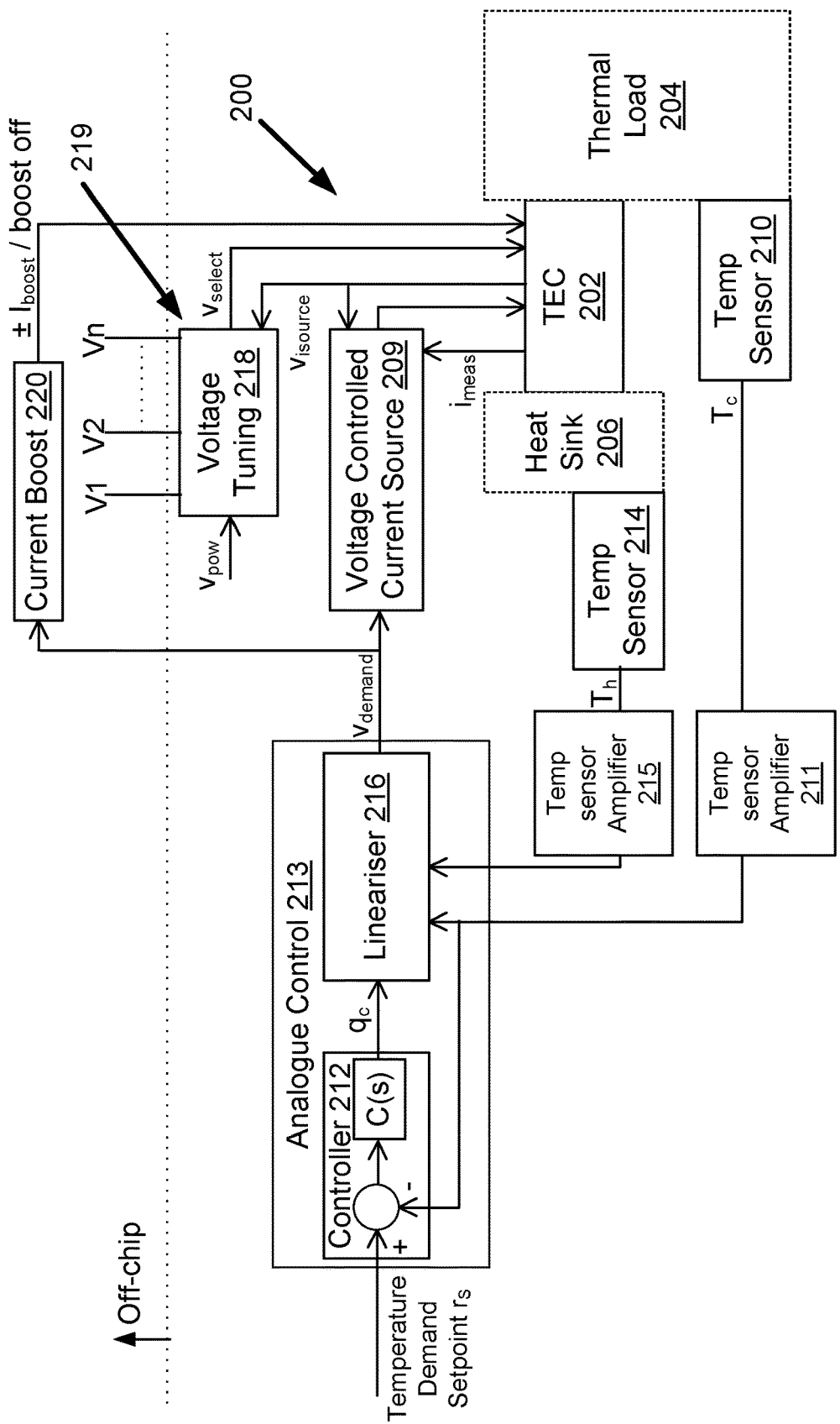

As seen in FIG. 2 the TEC 202 can pump heat in either direction between a thermal load 204, whose temperature is to be controlled, and a heat sink 206 (or heat store). The control circuit 200 controls the supply of electrical current provided to the TEC 202 from an integrated voltage controlled linear current source 209.

The control cell 200 includes a temperature sensor 210 to measure the temperature, $T_c$, of the thermal load 204, a temperature sensor 214 to measure the temperature, $T_h$, of the heat sink/store 206, and temperature sensor amplifiers 211, 215 for amplifying the signals representing the temperatures sensed by the temperature sensors 210, 214 respectively.

The measured temperature, $T_c$, of the thermal load 204 is compared to the desired set-point, $r_s$, (referred to as the temperature demand) within an analogue control circuit 213 comprising an analogue controller 212 and a lineariser 216. The analogue controller 212 applies a linear control function, C(s), to the difference between desired set-point, $r_s$, and the measured temperature, $T_c$, to provide a demanded heat flow, $q_c$. The linear function, C(s), is implemented using analogue circuitry.

Beneficially, the applicability of the linear analogue controller 212 is extended to the typically non-linear case of a TEC by means of the lineariser 216, which takes demanded heat flow, $q_c$, as an input and that outputs a voltage signal, $v_{demand}$, corresponding to the required current based on the thermal state of the TEC 202 as represented by the measured temperature, $T_c$, of the thermal load 204, and the measured temperature, $T_h$, of the heat sink/store 206.

The lineariser 216 is designed effectively to linearise the control loop by removing the temperature dependence of the small signal gain. Rather than implement the lineariser using digital circuitry, however, the lineariser 216 is beneficially implemented using analogue circuitry that allows the control circuitry, and hence the TEC control cell 200, to be scaled down significantly to an extent not possible with digital circuitry.

Advantageously, as will be described in more detail later, the lineariser 216 of this example has been designed by analytic inversion of a combined thermal and electrical model, and only requires knowledge of certain key parameters of the TEC 202 itself to function correctly. Whilst the function of the lineariser 216 is, itself, non-linear the techniques used beneficially result in a relatively simple structure that allows analogue implementation. The required current as represented by the voltage signal, $v_{demand}$, is input to the voltage controlled current source 209. A feedback current sensed at the TEC 202, $i_{meas}$, is also provided as an input to the local controlled current source 209 as part of a current control loop.

The proposed TEC control cell 200 also uses an advantageous combination of integrated, TEC cell specific, local linear current sources and external voltage and current sources that are common to all TEC cells being controlled by the control circuitry.

Specifically, whilst the TEC control cell 200 provides current to the TEC 202 from a local linear current source 209, the power dissipation, and therefore silicon area, is minimised by an adaptive voltage tuning circuit 218 that dynamically selects an optimum one of a bank 219 of externally generated (i.e. generated off chip) power supply voltages, V1, V2 . . . Vn to drive a current through the TEC 202. These voltage supplies 219 are provided by off-chip circuitry that is common to all TEC control cells and can dissipate significant power.

The selected voltage, $v_{select}$, is chosen such that the voltage applied across the local current source 209, $v_{isource}$, is minimised to approximately a predetermined voltage reference value, $v_{pow}$ (set for example to about 0.5V). Thus, where there are a plurality of TEC control cells 200, each control cell can individually select a different optimum supply voltage, depending on that control cell's requirements, thereby individually minimising the local power dissipation associated with that cell.

Moreover, advantageously in this example, an external (off-chip) current source 220 (referred to as 'current boost' in FIG. 2) is provided for selectively boosting the maximum current supplied to the TEC 202, dynamically when additional current is required (e.g. when a temperature change is required), further reducing the 'on-chip' power dissipation associated with the TEC control cell 200 (i.e. by moving power dissipation associated with the largest current requirement off-chip).

Beneficially, when a plurality of TEC control cells are integrated in close proximity on a single chip the temperature changes (which require the highest currents) for each TEC are staggered in time to ensure that only a single TEC control cell (or subset of TEC control cells) requires the additional 'boost' current at a time thereby minimising the number of separate external current boost sources required.

It can be seen therefore, that the localised (TEC Cell specific) closed-loop control and low power dissipation of the control cells enables them to be located in relatively close physical proximity on a single silicon chip. Thus, the control system of FIG. 2 alleviates at least some of the difficulties associated with the production of miniaturised, scalable, thermo-electric cooler (TEC) control cells that incorporate all circuitry necessary to implement independent temperature control.

Miniaturisation of the TEC control cell has the benefit that it enables construction of arrays of independent TEC elements with localised drive circuitry thereby allowing complex temperature profiles to be maintained across a surface. Localisation of the drive circuitry removes scaling limitations imposed by the need for independent electrical connections, offering the potential to create dynamic, temperature controlled surfaces comprising large multi-element TEC arrays.

One of the many applications enabled by this technology is, for example, the creation of a large number of independent thermal zones within a static or flowing medium such as a fluid. These independent thermal zones can be used to conduct many parallel chemical reactions, in applications where those reactions have temperature dependent outcomes. This functionality has widespread relevance to biochemical applications.

Multiple TEC Cell Circuit Architecture

Figure 3:
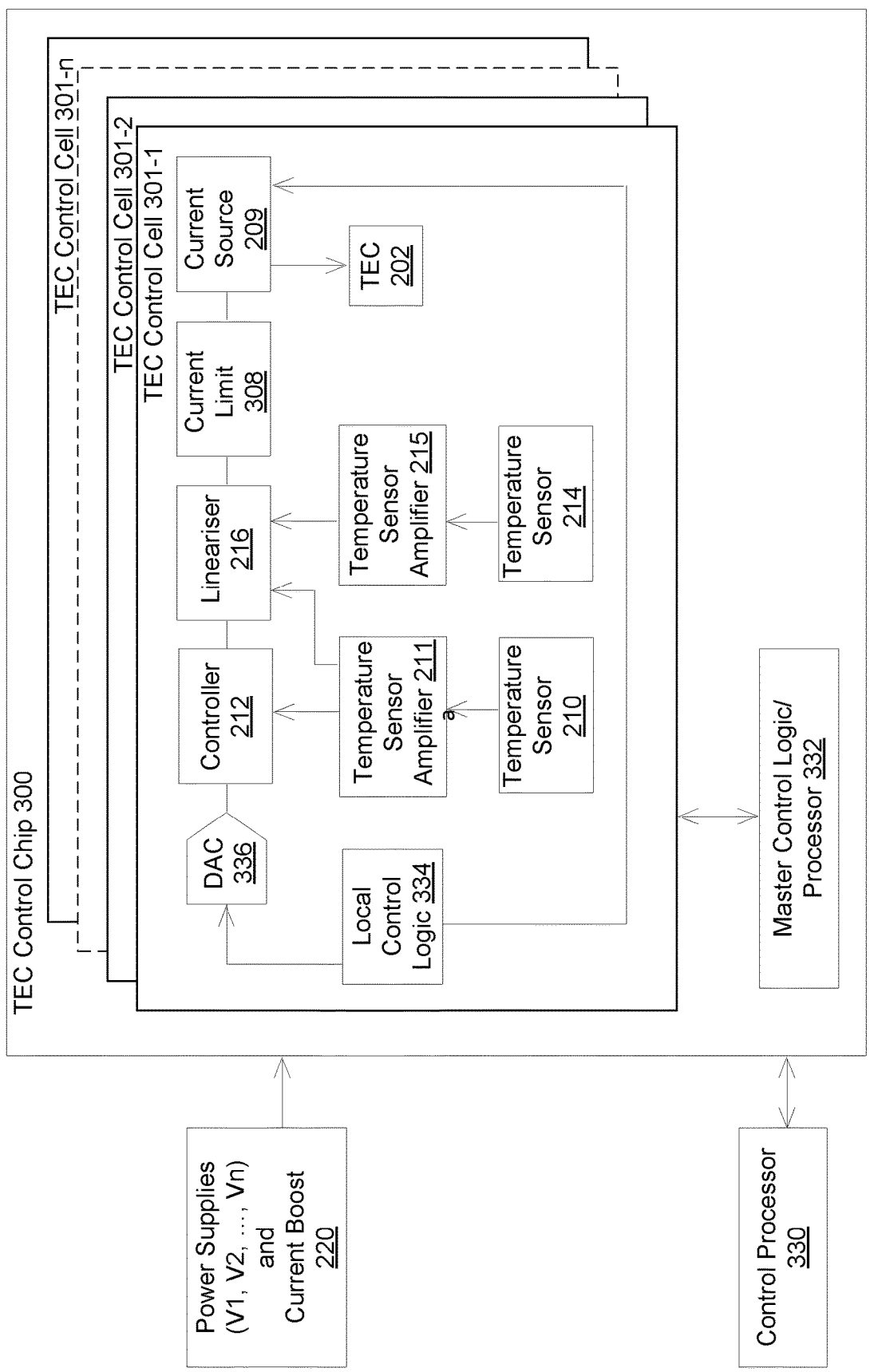
FIG. 3 is a simplified block schematic illustrating a TEC control cell circuit architecture for a TEC control chip.

FIG. 3 is a simplified block schematic illustrating a TEC control cell circuit architecture for a single TEC control chip 300 comprising a plurality of TEC control cells 301-1, 301-2, and 301-n (of which there may be any appropriate number). It will be appreciated that while in FIG. 3 a block schematic is shown for only one of the TEC Cells 301 for reasons of clarity, in reality each of the TEC Cells 301 comprises a similar control circuit.

In FIG. 3 each TEC control cell 301-1, 301-2, and 301-n is similar (and can be identical) to the TEC control cell 200 illustrated in FIG. 2 and like functional elements are provided with like reference numerals. However, some of the functional elements highlighted in FIG. 3 have been omitted from FIG. 2 and vice versa. In particular, for example, FIG. 3 shows the presence of a current limiter 308 between the lineariser 216 and the current source 209 for limiting the current supplied by the current source 209.

The TEC control chip 300 is provided with internal master control logic 332 which includes a processor. In operation, control logic 334 within each cell requests a current boost from the on-chip master control logic 332. The master processor assigns a free boost circuit 220, and communicates this back to the local control logic 334. An external (off-chip) processor 330 may be provided to provide instructions to the on-chip master control logic 332 for the purposes of configuring temperature transitions and/or set-points.

To facilitate control of the TECs 202, the on-chip master control logic 332 is shared by all TEC control cells 301, for routing control signalling to the appropriate TEC control cell 301, and local control logic 334 integrated into each TEC control cell 301 respectively for providing the control signalling to the local controller 212 for that TEC control cell 301 via a digital to analogue converter (DAC) 336 in order to set the desired temperature set-points.

Multiple TEC Cell Physical Architecture

Figure 4:
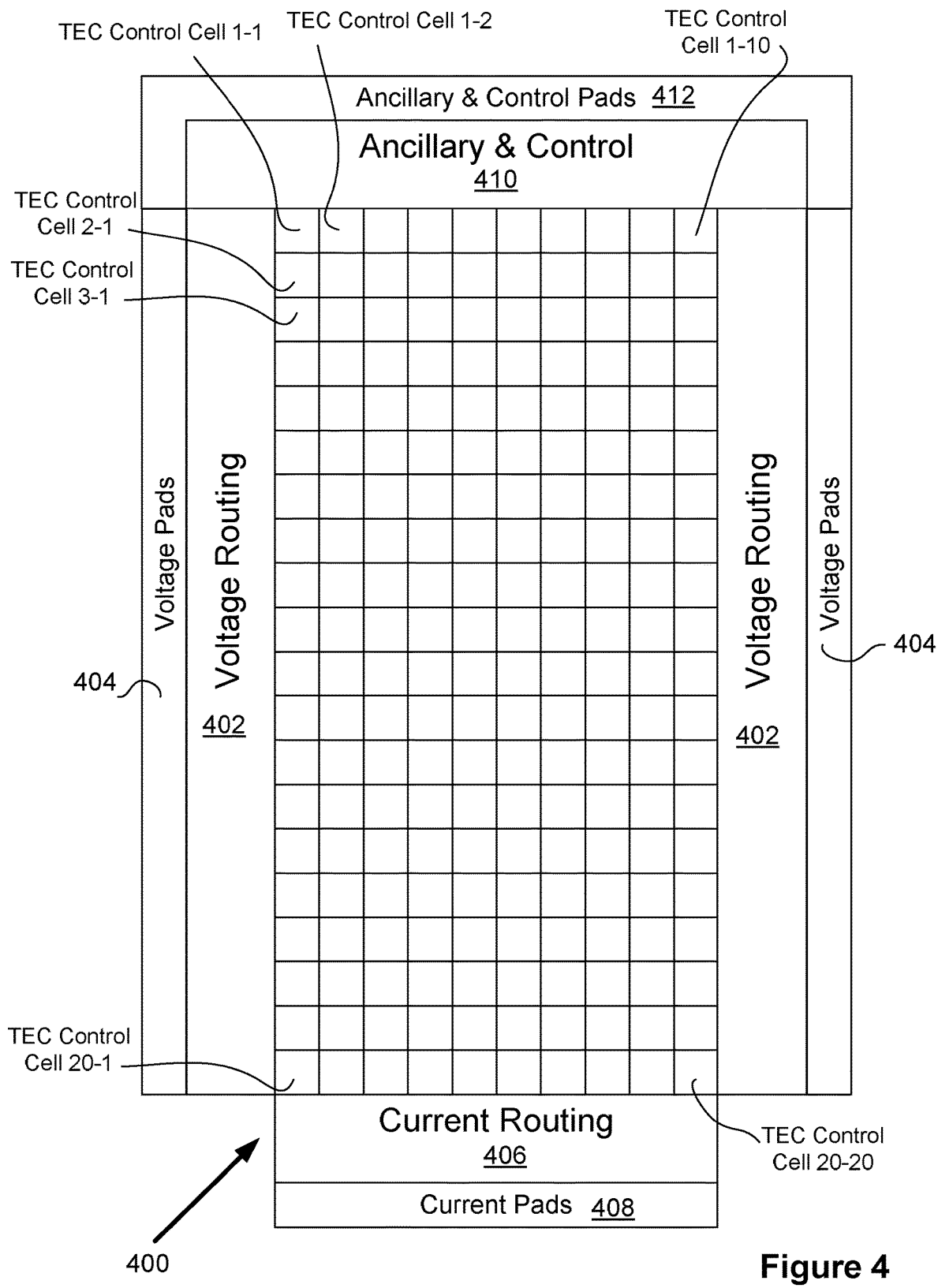
FIG. 4 illustrates a possible physical architecture for a TEC control chip.

FIG. 4 is a simplified diagram illustrating, generally at 400, a possible physical architecture for a TEC control chip 300 similar (or identical) to that of FIG. 3.

As seen in FIG. 4 the physical architecture provides for a single chip comprising, in this example, 200 TEC control cells arranged in relative close proximity to one another, in 20 rows of 10 (each cell being referenced x-y where 'x' is the row number and 'y' is the column number). In order to provide connections to each of the externally generated power supply voltages, voltage routing circuitry 402 is provided (in this example on either side of the chip respectively adjacent to the $1^{st}$ and the $10^{th}$ columns of cells). The voltage routing circuitry 402 connects each TEC control cell to a plurality of easily accessible voltage pads 404 via which the chip can be connected to the externally generated power supply voltages.

In order to provide connections to each of the current boost supplies 220, current routing circuitry 406 is also provided (in this example at the 'bottom' of the chip as viewed in FIG. 4 adjacent the $20^{th}$ row of cells). The current routing circuitry 220 connects each TEC control cell to a plurality of easily accessible current connection pads 408 via which the chip can be connected to the current boost supplies 220.

Ancillary and control circuitry 410 for providing common on-chip ancillary and control functionality for all TEC control cells, such as the master control logic shown in FIG. 3, is also provided on the TEC control chip (in this example at the 'top' of the chip as viewed in FIG. 4 adjacent the $1^{st}$ row of cells). The ancillary and control circuitry 410 is made accessible for external connection via ancillary and control connection pads 412.

It will be appreciated that the physical architecture shown in FIG. 4 is purely provided as an example illustrating a convenient way in which an array of TEC control cells comprising thin-film TECs, and associated circuitry, may be integrated onto a single silicon chip (or other appropriate substrate) cost effectively in a particularly space efficient manner. Any suitable physical architecture may, of course, be used to implement, depending on application requirements, any number of TEC control cells in an array of any suitable dimensions.

Analogue Lineariser Design

The design of the lineariser 216 forming part of the circuit shown in FIG. 2 and the architecture shown in FIG. 3 is based on one of a number of existing models for TEC behaviour. Lineykin and Ben-Yaakov [1] describe an electrical model that treats the thermal properties of heat flow, thermal resistance and thermal mass by using current, resistance and capacitance as electrical analogues. The model describes the properties of the TEC using the following parameters:

(1) α—the Peltier coefficient in units of $WK^{-1}A^{-1}$
(2) R—the electrical resistance in units of Ω
(3) θ—the thermal leakage resistance in units of $KW^{-1}$ FIG. 5 shows, generally at 500, the model's equivalent circuit, which describes the heat flow from the controlled (thermal load) side of the TEC at temperature $T_c$ to the heat-sink side of the TEC at temperature $T_h$.

The resulting expression for heat flow from the controlled side ($q_c$) is:

$$q_c(T_c, T_h, I) = I\left(\alpha T_c - I\frac{R}{2}\right) - \frac{(T_c - T_h)}{\theta} \quad (1)$$

where I is the electrical input current and all other terms have been defined. The quadratic dependence of heat flow on current shows that the small-signal gain between heat pumped and current delivered is not constant:

$$\frac{dq}{dI} = \alpha T_c - IR \quad (2)$$

The presented design utilises this model by applying inversion to determine the required current for a given heat flow:

$$I(q_c, T_c, T_h) = \frac{\alpha}{R}T_c - \sqrt{\left(\frac{\alpha}{R}T_c\right)^2 - \frac{2}{R}\left(\frac{T_h - T_c}{\theta} + q_c\right)} \triangleq f_{linearise} \quad (3)$$

This function is the desired form for the lineariser because it converts heat demand into required current and has a constant small-signal gain ($dq \propto d(f_{linearise})$).

The resulting control system architecture is shown in FIG. 6 generally at 600. Whilst, in principle, this could be implemented on a processor or other digital circuit to allow minimisation of the circuit size it is beneficial to approximate the control scheme using analogue electronics.

The controller, C(s), is a linear function that, as those skilled in the art would understand, is straightforward to design using analogue circuitry, by decomposing the transfer function into constituent poles and zeros that are implemented using passive or active stages as required.

The non-linear function of the lineariser is less straight forward but in the present example is decomposed into its basic operators, as shown in FIG. 7, and implemented as illustrated generally at 700 using, in this example, a current mode circuit approach.

As seen in FIG. 7, a number of the key terms that go to forming equation 3 are each represented by respective input branch 710, 712, 716, 718 of the lineariser circuit. More specifically the lineariser includes:
(a) a heat sink/source measured temperature, $T_h$, multiplied by 2/Rθ branch 710;
(b) a demanded heat flow, $q_c$, multiplied by 2/R branch 712;
(c) a thermal load measured temperature, $T_c$, multiplied by 2/Rθ branch 716; and
(d) a thermal load measured temperature, $T_c$, multiplied by α/R branch 718.

Further, as seen in FIG. 7, the output of the $T_c$ multiplied by α/R branch 718 is squared by an associated squaring function 720. The output of the squaring function 720 and the outputs of the $T_h$ multiplied by 2/Rθ branch 710, the $q_c$ multiplied by 2/R branch 712 and the $T_c$ multiplied by 2/Rθ branch 716 are combined using addition and subtraction to give the $$\left(\frac{\alpha}{R}T_c\right)^2 - \frac{2}{R}\left(\frac{T_h - T_c}{\theta} + q_c\right)$$

part of equation (1). The square root of this combination is performed by the square root function 722 and the result of the square root function 722 is subtracted from the $T_c$ multiplied by α/R branch 718 to give an output, $f_{linearise}$, corresponding to the result of equation (1).

FIG. 8, for example, shows an exemplary current-mode embodiment of the lineariser design generally at 800. In FIG. 8 the inputs $V_{THS}$, $V_{qsample}$ and $V_{Tsample}$ respectively correspond to the heat sink/source measured temperature, $T_h$, the demanded heat flow, $q_c$, and thermal load measured temperature, $T_c$.

As seen in FIG. 8, the current-mode circuit includes a plurality of operational transconductance amplifiers 810, 812, 816, 818. The transconductance amplifiers 810, 812, 816, 818 respectively correspond to the function performed by each of the branches 710, 712, 716, 718 described with reference to FIG. 7 (i.e. the transconductance amplifier 8xx corresponding to the function of branch 7xx).

A non-linear squaring function 820 and a square root function 822 are also provided in the circuit of FIG. 8 using a trans-linear approach.

Referring to FIG. 9, for example, this shows, schematically, an example of a trans-linear square root circuit generally at 900. Trans-linear circuits rely on the logarithmic behaviour of a MOSFET in weak inversion and the summation of logarithms rule (log(ab)=log(a)+log(b)) to create an appropriate non-linear response.

FIG. 10 is a graph illustrating a comparison of the derived lineariser function of equation (1) with a simulation of the trans-linear analogue implementation of that lineariser function. Comparing the derived lineariser function with the simulation shows that the circuit provides a good approximation.

It will be appreciated that other non-linear functions, such as rate limiters for protecting the TEC or dynamic current limits designed to prevent thermal runway can also be implemented using a trans-linear approach.

Current Drive Circuitry

FIG. 11 shows, generally at 1100, a TEC array control system comprising multiple control cells 301-1, 301-2, ... 301-n. In FIG. 11 In FIG. 3 each TEC control cell 301-1, 301-2, and 301-n is similar (and can be identical) to the TEC control cell 200, 301 illustrated in FIGS. 2 and 3 and like functional elements are provided with like reference numerals.

For simplicity and clarity of explanation, the TEC control cells 301 shown in FIG. 11 correspond only to the TEC control cells of the first row of an array of cells (e.g. similar to that illustrated in FIG. 4) and are therefore labelled '1-1' to '1-n'. It will be appreciated, however, that there will be other rows of such TEC control cells (e.g. a row of cells '2-1' to '2-n' through to a row of cells 'm-1' to 'm-n'). Whilst one control cell is shown in detail to illustrate, primarily, how the controlled current source 209 can be implemented in a working example, it will be appreciated that each control cell will be implemented in a similar manner.

As seen in FIG. 11, the TEC control cells 301-1, 301-2, ... 301-n are controlled via on-chip master control logic 332 as described more generally with reference to FIG. 3.

A bank of voltage supplies 219 and a bank of current boost supplies 220 (in this example four) are provided as described with reference to FIG. 2.

The controlled current source 209 is implemented as a pair of conventional closed-loop common-source amplifiers (Id) in conjunction with an H-Bridge structure (Sp1, Sp2, Sn1, Sn2) that enables bi-directional current control through the TEC.

The analogue controller 213 including the lineariser 216 and linear controller 212 controls the current source 209 based on a thermal load temperature demanded via the DAC 336 and based on the thermal load temperature and heat sink temperature as measured by temperature sensors 210 and 214 and amplified by temperature sensor amplifiers 211 and 215 (represented in FIG. 11 by a single ratiometric temperature sensor amplifier functional block).

The output of the DAC 336 is controlled via local control logic 334 (which comprises a logic controller) that is ultimately controlled via on-chip master control logic 332 as described with reference to FIG. 3.

The analogue controller 213 compares a set-point temperature (set by the logic controller 334 and DAC 336) to the measured temperatures and determines an appropriate current demand, which it communicates to a current demand block 1110 as a voltage, $v_{demand}$. A comparator determines if the demand is positive or negative by comparing the voltage, $v_{demand}$ is above or below a mid-point, $v_{mid}$ and sets the switches Sp1/Sp2 appropriately.

The other functionality of the architecture shown in FIG. 11 is configured to reduce the power dissipation within the current-control amplifiers, without which the physical size of the transistors in those amplifiers would inhibit miniaturisation and hence preclude a desirable level of miniaturisation.

In more detail, the architecture shown in FIG. 11 includes two mechanisms which contribute to minimising, during operation, the power dissipation within the transistors of the current source 209 (Id) providing the driving current.

Firstly, the voltage across the transistors of the operating current source 209 is kept as low as possible, by a mechanism for selecting the H-Bridge voltage supply from the plurality of external power supply voltages 219 (V1, ... Vn). This achieved by means of a switch bank (S0 ... Sn) which is automatically switched to select an optimum supply voltage by a mixed-signal servo loop 1112 (integrating difference amplifier plus analogue to digital converter (ADC)). The mixed-signal servo loop is designed effectively to select the switch bank setting that keeps the current source voltage from the active side of the bridge at a voltage set-point ($V_{pow}$), which can be as low as the voltage difference between the voltage supplies (e.g. 0.5V).

Assuming that the servo-loop 1112 has a higher loop bandwidth than that of the current sources 209 themselves, the current sources 209 will be isolated from the need to provide significant voltage compliance to drive the TECs 202 and power dissipation is thus reduced significantly. For example, a conventional thin-film TEC may require as much as 25V compliance to cope with all possible temperature ranges; reducing the current source voltage to 0.5V by implementing the proposed scheme reduces maximum dissipation by a factor of 50.

Secondly, further reduction of power dissipation can be achieved by limiting the maximum current supplied by each TEC control cell 301.

In order to compensate for the intermittent need for higher currents that occur during temperature transitions, an additional 'boost' current (Ib) is supplied by means of a selected one of the off-chip current sources 220, which can dissipate significant power.

A current boost switch bank 1112 enables the external current boost sources 220 to be shared by all TEC control cells 301, with each cell 301 being able to use any boost source 220 depending on prevailing requirements.

Control of access to the shared current boost sources 220 is implemented via the master control logic 332 and local control logic 334, which assigns current boost sources 220 to the TEC control cells 301, based on the availability of the current boost sources 220, and in response to an automatic request triggered by the TEC control cell circuitry, when a large enough current is demanded by the analogue controller 213. More specifically, a window comparator compares the demand voltage, $v_{demand}$, to a positive threshold 'RefP' and a negative threshold 'RefN'. If the demand exceeds the corresponding threshold (in the positive or negative direction) this indicates that the current demanded has exceeded what can be supplied by the in cell current sources and the window comparator outputs a signal that triggers the local logic controller 334 to negotiate with the master control logic 334 for a free boost supply. The local logic controller 334 switches in the assigned boost supply (in the appropriate direction to heat or to cool), and at the same time triggers a boost enable signal. This causes a voltage, $V_{boost}$, to be subtracted from $V_{demand}$ by the current demand block, thereby reducing the local current by the same amount that the external boost current has increased it. In this way, operation of the boost is entirely automatic and determined by the output of the analogue controller 213.

If a boost source were not available when required, then the current would be limited, In order to limit the demand on the available current boost sources 220 (and thereby allow the number of boost sources 220 to be minimised) temperature transitions are beneficially staggered such that a limited number of control cells request a boost current at any point in time.

As shown in FIG. 12, which shows the timing of temperature transitions for eight TEC control cells 301, the temperature transitions for groups of four TEC control cells 301 are arranged to prevent the system from running out of available boost supplies. In the example of FIG. 12, TEC control cells 1-1 to 1-4 are in a group for which temperature transitions are controlled to be during a first time window, TEC control cells 1-5 to 1-8 are in a group for which temperature transitions are controlled to be during a second time period that follows and does not overlap with the first time window.

Thus, during the first transition time window when the current demand of TEC control cells 1-1 to 1-4 is likely to be highest, and the current demand of TEC control cells 1-5 to 1-8 (and any other TEC control cells) is likely to be lower, there are sufficient boost supplies to handle the demand even if all four TEC control cells 1-1 to 1-4 require additional current. Each of the TEC control cells 1-1 to 1-4 is thus provided current from a different respective boost supply in dependence on requirements.

Similarly, during the second time transition time window when the current demand of TEC control cells 1-1 to 1-4 is likely to be lower, and the current demand of TEC control cells 1-5 to 1-8 is likely to be highest, the TEC control cells 1-5 to 1-8 are each able to receive boost current from a respective boost supply in dependence on requirements.

The reduction in power dissipation that can be achieved depends on the ratio between maximum local current and the boost current, which in turn depends on the number of boost sources and simultaneous temperature transitions. A conservative setting would be to make the boost current equal to the maximum local current, which reduces the maximum local dissipation by a factor of 2.

FIG. 13 shows the physical layout of a single TEC control cell suitable for use in the system of FIG. 12. The physical layout of the TEC control cell is a balance between the size of the current source transistors, the number of voltage supplies that must be routed to each cell and the number of common boost supplies. A 50V 1 A driver will fit comfortably within a 1 mm×1 mm area, as shown in FIG. 13, which is consistent with the power required by a TEC of similar dimensions. As TEC dimensions shrink, the current demand reduces and there is therefore a corresponding reduction in the size of the control cell.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

For example whilst, for the purposes of a clear narrative, a number of advantageous features have been described in combination in a single embodiment of a TEC control cell and wider TEC control system, not all of these advantageous features need be present in a TEC control cell or wider TEC control system to provide a benefit. For example, voltage selection may be provided without current boost supplies, and/or other advantageous features and still provide significant advantages over known systems. Similarly, one or more current boost supplies may be provided without voltage selection, and/or other advantageous features and still provide significant advantages over known systems.

Whilst the use of an analogue lineariser is particularly advantageous because of the significant benefits it can provide in terms of miniaturisation, there may be other applications, and in particular applications of TEC control circuitry where miniaturisation may not be so critical but the benefits of using a lineariser are, nevertheless, advantageous. In such applications, a digital lineariser may, of course, be used advantageously.

It will be appreciated that whilst, in the above example, an additional temperature sensor/amplifier arrangement has been used to measure the temperature of the heat sink/store, if the dynamics of the thermal system are well known, then it is possible to use a further circuit block to estimate this temperature instead.

It will be appreciated that whilst current-mode techniques are particularly beneficial, voltage-mode techniques can also be used to implement the non-linear functions of the lineariser. Nevertheless, the trans-linear approach is particularly beneficial because it can generally be expected to result in more efficient use of silicon area.

Various other modifications will be apparent to those skilled in the art and will not be described in further detail here.

REFERENCES

[1] S. Lineykin and S. Ben-Yaakov, 'PSPICE-Compatible Equivalent Circuit of Thermoelectric Cooler', Proc 36th IEEE PESC, p. 608-612 (2005).

The invention claimed is:

1. A controller for a thermo-electric cooler, the controller comprising:
   a current source for providing current for driving said thermo-electric cooler;
   a plurality of voltage supply connections for providing a plurality of different voltages for driving current controlled by said current source through said thermo-electric cooler; and
   voltage selection circuitry for selecting a voltage from said plurality of different voltages, when connected, and for applying the voltage selected to said thermo-electric cooler;
   wherein, when selecting said voltage from said plurality of different voltages, said voltage selection circuitry is configured to select the voltage that, when compared to the other voltages of said plurality of voltages, minimises a potential difference across said current source.

2. A controller as claimed in claim 1, wherein said voltage selection circuitry is operable to minimise a potential difference across said current source by providing a potential difference across said current source that is closest to a predetermined reference voltage.

3. A controller as claimed in claim 2, wherein said voltage selection circuitry is configured to select the voltage that, when compared to the other voltages of said plurality of voltages, provides a potential difference across said current source that is less than 2V, preferably less than 1V (for example, approximately equal to (within 10% of) 0.5V).

4. A controller as claimed in claim 2, wherein said predetermined voltage is approximately equal to (within 10% of) the potential difference between a pair of said plurality of different voltages that are adjacent one another in voltage when said voltages are ordered by increasing voltage.

5. A controller as claimed in claim 1, wherein said voltage selection circuitry comprises a mixed signal servo loop.

6. A controller as claimed in claim 1, further comprising: control circuitry for controlling said current source, in dependence on changes in the temperature of a thermal load, in order to maintain the temperature of the thermal load; wherein said control circuitry comprises a non-linear control function for providing a non-linear response, to changes in said temperature, for controlling said current source whereby to maintain the temperature of the thermal load; and wherein said non-linear control function is implemented using analogue circuitry.

7. A controller as claimed in claim 1, wherein said current source is a local current source and further comprising at least one current boost connection for connecting to a current boost source for providing additional current for driving said thermo-electric cooler; and current boost circuitry for requesting current supply from said current boost source for driving said thermo-electric cooler; wherein, said current boost circuitry is configured to request said current supply from said current boost source when current from said local current source will be insufficient to drive said thermo-electric cooler, to receive an indication that a current boost source is available responsive to said request, and to connect to said available current boost source responsive to said indication.

8. A thermo-electric cooler cell comprising a thermo-electric cooler and a controller according to claim 1.

9. Thermo-electric cooler apparatus for providing independent and localised thermo-electric cooling or heating at a plurality of different locations, the thermo-electric cooler apparatus comprising an array of thermo-electric cooler cells according to claim 8.

10. A method performed by a controller for a thermo-electric cooler, the method comprising: providing, from a current source, current for driving said thermo-electric cooler; providing a plurality of different voltages, at a plurality of voltage supply connections, for driving current controlled by said current source through said thermo-electric cooler; and selecting, using voltage selection circuitry, a voltage from said plurality of different voltages, and applying the voltage selected to said thermo-electric cooler; wherein, when selecting said voltage from said plurality of different voltages, said voltage selection circuitry is configured to automatically select the voltage that, when compared to the other voltages of said plurality of voltages, minimises a potential difference across said current source.

* * * * *